(12) United States Patent
Yamatani et al.

(10) Patent No.: US 12,603,292 B2
(45) Date of Patent: Apr. 14, 2026

(54) ENERGY STORAGE DEVICE

(71) Applicant: GS Yuasa International Ltd., Kyoto (JP)

(72) Inventors: Norio Yamatani, Kyoto (JP); Morito Tanabe, Kyoto (JP); Takeshi Sasaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 540 days.

(21) Appl. No.: 18/022,661

(22) PCT Filed: Aug. 23, 2021

(86) PCT No.: PCT/JP2021/030703
§ 371 (c)(1),
(2) Date: Feb. 22, 2023

(87) PCT Pub. No.: WO2022/045031
PCT Pub. Date: Mar. 3, 2022

(65) Prior Publication Data
US 2023/0317957 A1      Oct. 5, 2023

(30) Foreign Application Priority Data

Aug. 24, 2020     (JP) ................................. 2020-140812

(51) Int. Cl.
H01M 4/62          (2006.01)
H01M 4/02          (2006.01)
(Continued)

(52) U.S. Cl.
CPC ........... H01M 4/625 (2013.01); H01M 4/587 (2013.01); H01M 50/538 (2021.01); H01M 2004/021 (2013.01); H01M 2004/027 (2013.01)

(58) Field of Classification Search
CPC .... H01M 4/625; H01M 4/587; H01M 50/538; H01M 2004/021; H01M 2004/027;
(Continued)

(56) References Cited

U.S. PATENT DOCUMENTS 6,432,585 B1 * 8/2002 Kawakami ............ H01M 4/244
429/235
9,196,427 B2    11/2015 Tsutsumi et al.
(Continued)

FOREIGN PATENT DOCUMENTS

JP          2013-016440 A      1/2013
JP          2013-191467 A      9/2013
(Continued)

OTHER PUBLICATIONS

International Search Report (ISR) dated Oct. 19, 2021 filed in PCT/JP2021/030703.

*Primary Examiner* — Lisa S Park
(74) *Attorney, Agent, or Firm* — RANKIN, HILL & CLARK LLP

(57)          ABSTRACT

One aspect of the present invention is an energy storage device satisfying the following formula 1, in which a flat electrode assembly obtained by winding a positive electrode and a negative electrode with a separator interposed therebetween and having two curved surface portions facing each other, and a case that houses the electrode assembly, and at least one of the positive electrode and the negative electrode includes an active material layer containing active material particles and a fibrous conductive agent. In the formula 1, X is a distance from a distal end of one of the curved surface portions to the inner surface of the case facing the distal end of the curved surface portion as viewed in the winding axis direction of the electrode assembly. R is a length of a periphery of the one curved surface portion as viewed in the winding axis direction of the electrode assem- (Continued)

bly. D is an average particle size D50 of the active material particles. A is a surface roughness Ra of the active material layer.

$$(R/D)A \geq 2X \qquad 1$$

7 Claims, 4 Drawing Sheets

(51) Int. Cl.
$H01M\ 4/587$      (2010.01)
$H01M\ 50/538$      (2021.01)

(58) Field of Classification Search
CPC .......... H01M 4/13; H01M 4/62; H01M 10/04; H01M 10/052; H01M 10/0587; Y02E 60/10; Y02P 70/50; H01G 11/06; H01G 11/26; H01G 11/78
See application file for complete search history.

(56) References Cited

U.S. PATENT DOCUMENTS

| | | | |
|---|---|---|---|
| 10,116,005 | B2 | 10/2018 | Miyazaki et al. |
| 2012/0177961 | A1* | 7/2012 | Lee .................... H01M 50/103 |
| | | | 429/82 |
| 2013/0011707 | A1 | 1/2013 | Tsutsumi et al. |
| 2013/0244072 | A1 | 9/2013 | Miyazaki et al. |
| 2016/0155995 | A1 | 6/2016 | Takahata |

FOREIGN PATENT DOCUMENTS

| | | | | |
|---|---|---|---|---|
| JP | 2014-110105 | A | | 6/2014 |
| JP | 2014110105 | | * | 6/2014 |
| JP | 2015-22833 | A | | 2/2015 |
| JP | 2016-48698 | A | | 4/2016 |
| JP | 2016-181409 | A | | 10/2016 |
| JP | 2017-183151 | A | | 10/2017 |
| JP | 2017183151 | | * | 10/2017 |
| JP | 2019-9001 | A | | 1/2019 |
| JP | 2019-21805 | A | | 2/2019 |
| JP | 2019-46648 | A | | 3/2019 |
| JP | 2019-61734 | A | | 4/2019 |

* cited by examiner

ENERGY STORAGE DEVICE

TECHNICAL FIELD

The present invention relates to an energy storage device.

BACKGROUND ART

Chargeable and dischargeable energy storage devices (such as a secondary battery and a capacitor) are used for various devices, such as vehicles such as electric vehicles, household electric appliances, and mobile phones. As the energy storage device, there is known an energy storage device including a wound-type electrode assembly obtained by winding a band-shaped positive electrode including a positive active material layer containing positive active material particles and a band-shaped negative electrode including a negative active material layer containing negative active material particles stacked on one another with a band-shaped separator interposed therebetween (see Patent Documents 1 and 2). Such an electrode assembly is housed together with an electrolyte in a case to constitute an energy storage device.

PRIOR ART DOCUMENTS

Patent Documents

Patent Document 1: JP-A-2013-16440
Patent Document 2: JP-A-2013-191467

SUMMARY OF THE INVENTION

Problems to be Solved by the Invention

The electrodes (the positive electrode and the negative electrode) expand due to a decrease in binding force between the active material particles, generation of gas, or the like, associated with repeated charge-discharge. When the electrode expands, the active material particles are separated from each other, so that conductivity of the active material layer decreases, which causes a decrease in discharge capacity. Expansion of the electrode leads to expansion of the electrode assembly including the electrode. In particular, in the case of an energy storage device in which a flat wound-type electrode assembly is housed in a prismatic case, a flat portion of the electrode assembly is usually in contact with the inner surface of the case and thus is less likely to expand, but a curved surface portion is particularly likely to expand when not in contact with the inner surface of the case. This expansion of the curved surface portion may cause a decrease in capacity.

The present invention has been made in view of the foregoing circumstances, and an object of the present invention is to provide an energy storage device including a flat wound-type electrode assembly and having a high capacity retention ratio after charge-discharge cycles.

Means for Solving the Problems

One aspect of the present invention is an energy storage device satisfying the following formula 1, in which a flat electrode assembly obtained by winding a positive electrode and a negative electrode with a separator interposed therebetween and having two curved surface portions facing each other, and a case that houses the electrode assembly, and at least one of the positive electrode and the negative electrode includes an active material layer containing active material particles and a fibrous conductive agent:

$$(R/D)A \geq 2X \qquad 1$$

wherein X is a distance from a distal end of one of the curved surface portions to the inner surface of the case facing the distal end of the curved surface portion as viewed in the winding axis direction of the electrode assembly, R is a length of a periphery of the one curved surface portion as viewed in the winding axis direction of the electrode assembly, D is an average particle size D50 of the active material particles, and A is a surface roughness Ra of the active material layer.

Another aspect of the present invention is an energy storage device satisfying the following formula 2, in which a flat electrode assembly obtained by winding a positive electrode and a negative electrode with a separator interposed therebetween and having two curved surface portions facing each other, and a case that houses the electrode assembly, and at least one of the positive electrode and the negative electrode includes an active material layer containing active material particles and a fibrous conductive agent:

$$A/D \geq 0.2 \qquad 2$$

wherein D is an average particle size D50 of the active material particles, and A is a surface roughness Ra of the active material layer.

Advantages of the Invention

According to one aspect of the present invention, it is possible to provide an energy storage device including a flat wound-type electrode assembly and having a high capacity retention ratio after charge-discharge cycles.

MODE FOR CARRYING OUT THE INVENTION

First, an outline of an energy storage device disclosed in the present specification will be described.

An energy storage device according to one aspect of the present invention is an energy storage device ($\alpha$) satisfying the following formula 1, in which a flat electrode assembly obtained by winding a positive electrode and a negative electrode with a separator interposed therebetween and having two curved surface portions facing each other, and a case that houses the electrode assembly, and at least one of the positive electrode and the negative electrode includes an active material layer containing active material particles and a fibrous conductive agent:

$$(R/D)A \geq 2X \qquad 1$$

wherein X is a distance from a distal end of one of the curved surface portions to the inner surface of the case facing the distal end of the curved surface portion as viewed in the winding axis direction of the electrode assembly, R is a length of a periphery of the one curved surface portion as viewed in the winding axis direction of the electrode assembly, D is an average particle size D50 of the active material particles, and A is a surface roughness Ra of the active material layer.

An energy storage device ($\alpha$) according to one aspect of the present invention is an energy storage device including a flat wound-type electrode assembly and having a high capacity retention ratio after charge-discharge cycles. Although the reason why such an effect is produced is not clear, the following reason is presumed. As described above, one of the reasons why the capacity retention ratio after charge-discharge cycles is low in the conventional energy storage device including a flat wound-type electrode assembly is that the conductivity of the active material layer decreases due to the expansion of the curved surface portion of the electrode assembly. On the other hand, in the energy storage device ($\alpha$), it is presumed that the active material layer contains the fibrous conductive agent together with the active material particles and the decrease in the conductivity of the active material layer at the curved surface portion is suppressed by satisfying the formula 1, and as a result, the capacity retention ratio is improved. Hereinafter, the formula 1 and the like will be described in detail. The following lengths and the like will be described as lengths and the like in a state as viewed in the winding axis direction of the electrode assembly (see FIG. 2).

Figure 2:
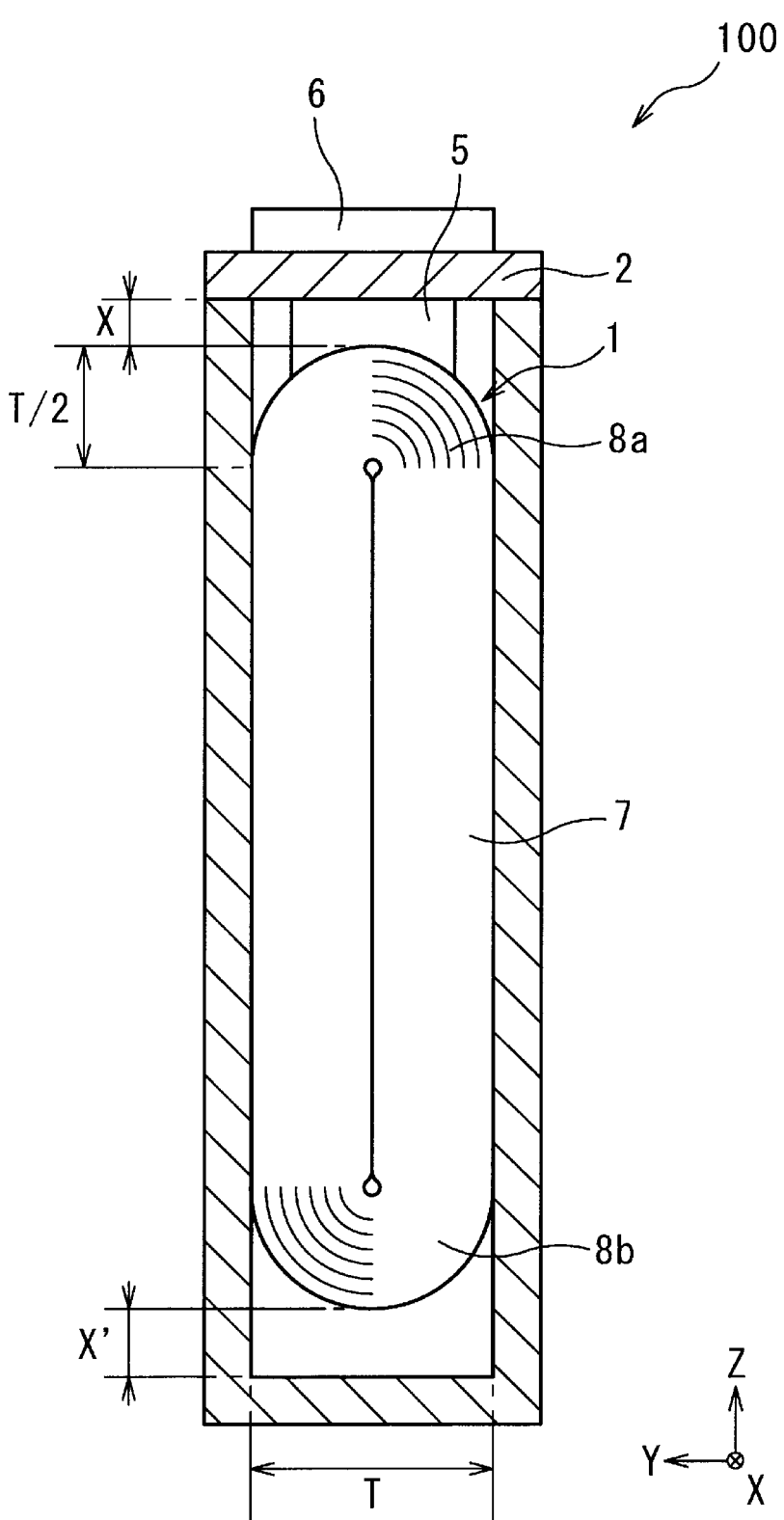
FIG. 2 is a schematic cross-sectional view taken along an arrow I-I of the energy storage device in FIG. 1.
Figure 3A:
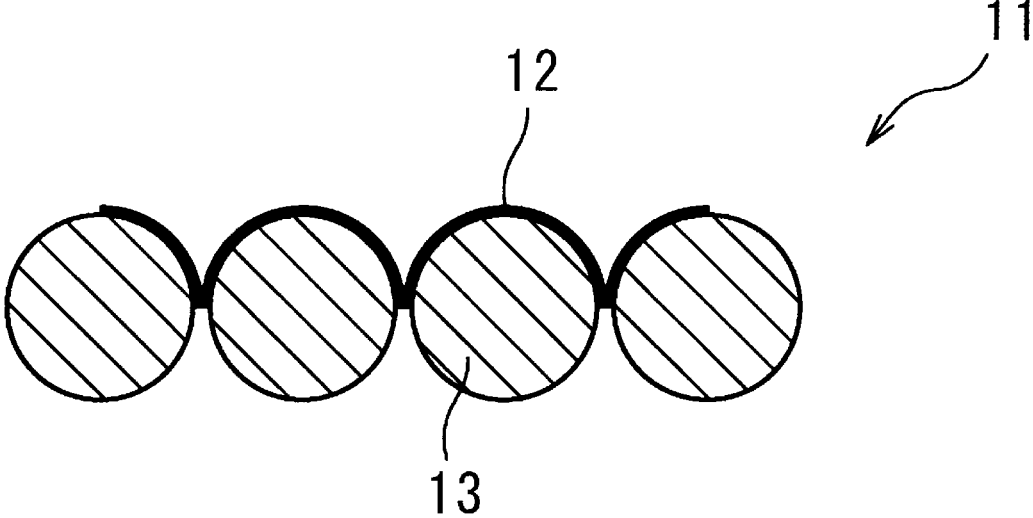
FIG. 3A is a first schematic diagram illustrating a state of a surface of an active material layer of an energy storage device according to an embodiment of the present invention.
Figure 3B:
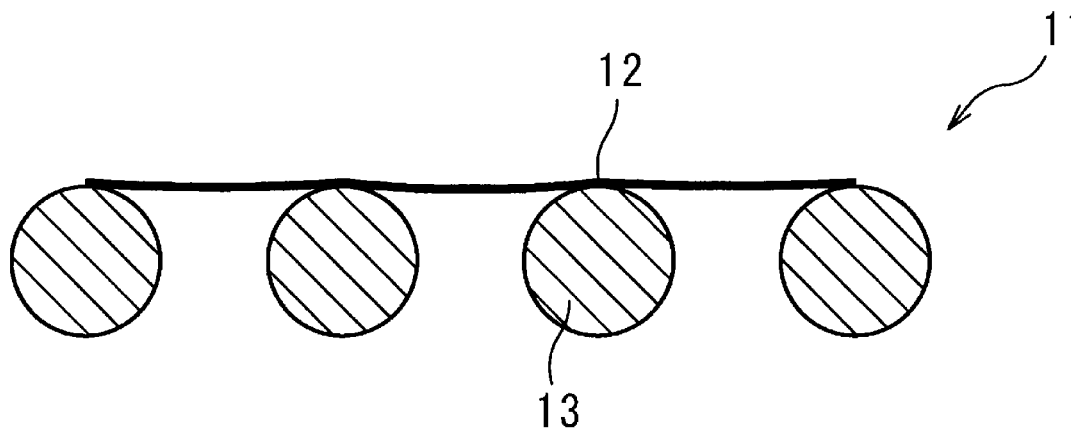
FIG. 3B is a second schematic diagram illustrating a state of a surface of an active material layer of an energy storage device according to an embodiment of the present invention.

With respect to the left side (R/D)A in the formula 1, R is a length (unit: mm) of a periphery of the curved surface portion 8a of the electrode assembly 1 (see FIG. 2). Also, D is an average particle size D50 (unit: $\mu$m) of the active material particles in the active material layer. Therefore, R/D represents the number of active material particles in the active material layer along the length direction of the periphery of the curved surface portion. In addition, A is the surface roughness Ra (unit: $\mu$m) of the active material layer, and represents the degree of height of irregularities on the surface of the active material layer. Therefore, the product (R/D)A of R/D and A represents the degree of length of the surface of the active material layer along the irregularities on the surface at the periphery of the curved surface portion. That is, even when the length of the periphery of the curved surface portion is the same, the length of the surface of the active material layer along the irregularities on the surface becomes long when the height of the irregularities on the surface (A: surface roughness Ra) of the active material layer is large or when the interval between the irregularities on the surface (D: average particle size D50 of the active material particles) of the active material layer is small. Here, as schematically shown in FIG. 3A, a fibrous conductive agent 12 present on an active material layer surface 11 is in contact along the surface of active material particles 13 to electrically connect the active material particles 13. At this time, it is considered that the fibrous conductive agent 12 is bent along the irregularities on the active material layer surface 11, that is, the shape of the active material particle 13 present on the active material layer surface 11 to come into contact with the plurality of active material particles 13, thereby securing conductivity between the active material particles 13. Then, even when the curved surface portion of the electrode assembly expands and the space between the active material particles 13 is widened as schematically shown in FIG. 3B, the fibrous conductive agent 12 extends straight and can come into contact with the plurality of active material particles 13, so that the conductivity between the active material particles 13 is secured. That is, it is considered that the fibrous conductive agent 12 can extend like a bellows while being in contact with the active material particles 13. At this time, it is shown that as the length of the surface of the active material layer along the irregularities of the surface at the periphery of the curved surface portion of the electrode assembly, that is, (R/D)A is longer, the length to which the fibrous conductive agent can extend is longer, that is, even when the curved surface portion expands, a decrease in conductivity between the active material particles can be suppressed.

On the other hand, with respect to the right side 2X in the formula 1, X is a distance (unit: mm) from a distal end of the curved surface portion 8a of the electrode assembly 1 to an inner surface of the case 2 facing the distal end of the curved surface portion 8a as shown in FIG. 2. Then, when the curved surface portion 8a expands and the length of the periphery of the curved surface portion 8a extends by 2X, it can be assumed that the distal end of the curved surface portion 8a comes into contact with the inner surface of the case 2 and further expansion is suppressed. In this manner, 2X indicates a rough indication of an upper limit at which the periphery of the curved surface portion extends.

That is, the above formula 1 indicates that even when the curved surface portion of the electrode assembly expands until coming into contact with the inner surface of the case associated with repeated charge-discharge, the decrease in conductivity between the active material particles can be suppressed by the fibrous conductive agent, and from the above, it is presumed that the capacity retention ratio of the energy storage device ($\alpha$) after charge-discharge cycles is increased.

The "curved surface portion" of the electrode assembly refers to a substantially semicircular portion located at both ends as viewed in a winding axis direction, and specifically, when a thickness of the electrode assembly is defined as T, a region from both ends of the electrode assembly to a length T/2 as viewed in the winding axis direction is defined as the curved surface portion (see FIG. 2). At this time, R (the length of the periphery of one curved surface portion) is $\Pi$T/2.

The "fibrous conductive agent" refers to a conductive agent having a deformable elongated shape. The ratio of the length to the diameter of the fibrous conductive agent is, for example, 10 or more. The diameter and length of the fibrous conductive agent are values measured in an image of a scanning electron microscope (SEM) or a transmission electron microscope (TEM) on the surface of the active material layer.

Regarding X, when the distances from the distal ends of the two curved surface portions to the inner surface of the case facing the distal ends are different, the shorter distance is defined as X. For example, in an energy storage device 100 of FIG. 2, a distance from a distal end of the upper curved surface portion 8a to an inner surface of the case 2 facing the distal end of the curved surface portion 8a is defined as X. Also, when another member (spacer or the like) exists between the distal end of the curved surface portion of the electrode assembly and the case, the distance from the distal end of the curved surface portion to the surface of the another member is defined as X. In other words, when the energy storage device includes other members other than the electrode assembly in the case, the "case"

in the definition of X includes other members other than the electrode assembly in the case. The other members do not include an electrolyte.

The term "average particle size D50 of the active material particles (D)" means a value at which a volume-based integrated distribution calculated in accordance with JIS-Z-8819-2 (2001) is 50% based on a particle size distribution measured by a laser diffraction/scattering method for a diluted solution obtained by diluting particles with a solvent in accordance with JIS-Z-8825 (2013).

The term "surface roughness Ra of the active material layer (A)" means an arithmetic average roughness measured according to JIS B0601: 2013. A sample for measuring the "surface roughness Ra of the active material layer (A)" is prepared by the following procedure. First, the energy storage device (secondary battery) is subjected to constant current charge with a charge current of 0.05 C until the voltage becomes an end-of-charge voltage under normal usage, so that the energy storage device is brought to a fully charged state. After a 30-minute pause, the nonaqueous electrolyte energy storage device is subjected to constant current discharge with a discharge current of 0.05 C to the lower limit voltage during normal usage. The battery is disassembled, the electrode is taken out, and a test battery using metal Li as a counter electrode is assembled. When the electrode is a positive electrode, constant current discharge is performed at a current value of 10 mA per 1 g of the positive active material until the positive electrode potential reaches 2.0 V vs. Li/Li$^+$, and when the electrode is a negative electrode, constant current discharge is performed at a current value of 10 mA per 1 g of the negative active material until the negative electrode potential reaches 1.5 V vs. Li/Li$^+$. The battery is disassembled again, and the electrode is taken out. The nonaqueous electrolyte attached to the taken-out electrode is sufficiently washed using dimethyl carbonate and dried at room temperature for 24 hours to obtain a measurement sample of surface roughness Ra.

An energy storage device according to another aspect of the present invention is an energy storage device (8) satisfying the following formula 2, in which a flat electrode assembly obtained by winding a positive electrode and a negative electrode with a separator interposed therebetween and having two curved surface portions facing each other, and a case that houses the electrode assembly, and at least one of the positive electrode and the negative electrode includes an active material layer containing active material particles and a fibrous conductive agent:

$$A/D \geq 0.2 \qquad\qquad 2$$

wherein D is an average particle size D50 of the active material particles, and A is a surface roughness Ra of the active material layer.

An energy storage device ($\beta$) according to one aspect of the present invention is an energy storage device including a flat wound-type electrode assembly and having a high capacity retention ratio after charge-discharge cycles. Although the reason why such an effect is produced is not clear, the following reason is presumed. A/D obtained by dividing the surface roughness Ra of the active material layer by the average particle size D50 of the active material particles represents the degree of length of the surface of the active material layer along the irregularities on the surface per unit length of the periphery of the curved surface portion of the electrode assembly. That is, it can be said that as the A/D is larger, the fibrous conductive agent in contact along the irregularities on the surface of the active material layer is present in a sufficiently bent state, and the length that can extend is longer. Then, if the A/D is 0.2 or more as in the above formula 2, even when the curved surface portion of the electrode assembly expands and the space between the active material particles is widened, the fibrous conductive agent sufficiently extends like a bellows, and the decrease in conductivity between the active material particles can be sufficiently suppressed. Therefore, it is presumed that the capacity retention ratio of the energy storage device ($\beta$) after charge-discharge cycles is increased.

The energy storage device ($\beta$) preferably further satisfies the following formula 1:

$$(R/D)A \geq 2X \qquad\qquad 1$$

wherein X is a distance from a distal end of one of the curved surface portions to the inner surface of the case facing the distal end of the curved surface portion as viewed in the winding axis direction of the electrode assembly, R is a length of a periphery of the one curved surface portion as viewed in the winding axis direction of the electrode assembly, and D and A have the same meaning as D and A in the formula 2.

When the energy storage device ($\beta$) further satisfies the above formula 1, the capacity retention ratio after charge-discharge cycles is further increased for the same reason as in the case of the energy storage device ($\alpha$).

The energy storage device ($\alpha$) and the energy storage device ($\beta$) preferably further satisfy the following formula 3:

$$0.06 \leq X/R \leq 0.12 \qquad\qquad 3$$

wherein X and R have the same meaning as X and R in the formula 1.

When X/R is small, that is, when the distance X from the distal end of the curved surface portion of the electrode assembly to the inner surface of the case is relatively short, the curved surface portion of the electrode assembly is likely to come into contact with the inner surface of the case due to expansion caused by a charge-discharge cycle, and the curved surface portion is likely to be pressed. Therefore, when the energy storage device ($\alpha$) and the energy storage device ($\beta$) are applied to a lithium ion energy storage device, resistance is easily increased due to compression of the separator at the curved surface portion. On the other hand, when the distance X from the distal end of the curved surface portion to the inner surface of the case is relatively long, a space in the case that does not contribute to charge-discharge becomes large, and the volume energy density of the energy storage device decreases. Therefore, when the energy storage device ($\alpha$) and the energy storage device ($\beta$) further satisfy the above formula 3, performance as the energy storage device is further enhanced.

The content of the fibrous conductive agent in the active material layer is preferably 0.01% by mass or more. In such a case, even when the curved surface portion of the electrode assembly expands, the decrease in conductivity between the active material particles can be particularly sufficiently suppressed by the presence of a sufficient amount of the fibrous conductive agent, so that the capacity retention ratio after charge-discharge cycles is further increased.

An average length of the fibrous conductive agent is preferably larger than the average particle size D50 of the active material particles. In such a case, when the curved surface portion of the electrode assembly expands and the interval between the active material particles is widened, the decrease in conductivity between the active material particles can be particularly sufficiently suppressed by the fibrous conductive agent having a sufficient length, so that the capacity retention ratio after charge-discharge cycles is further increased.

The "average length" of the fibrous conductive agent is defined as an average value of lengths of arbitrary 10 fibrous conductive agents observed with SEM or TEM.

It is preferable that the active material particles exist in a state of secondary particles in which a ratio of the average particle size D50 to a primary particle size is 3 or less, or primary particles that are not substantially aggregated. When such active material particles are used, an active material layer having a relatively large surface roughness Ra with respect to the average particle size D50 is formed, so that an energy storage device satisfying the formulas 1 and 2 is easily obtained.

The "primary particle size" of the active material particles is an average value of particle sizes of arbitrary 50 primary particles constituting the active material particles observed with the SEM. The primary particles are particles in which no grain boundary is observed in appearance in the observation with the SEM. The particle size of the primary particles is determined as follows. The shortest diameter passing through the center of the minimum circumscribed circle of the primary particle is defined as a minor axis, and the diameter passing through the center and orthogonal to the minor axis is defined as a major axis. The average value of the major axis and the minor axis is defined as the particle size of the primary particle. When there are two or more shortest diameters, a shortest diameter with the longest orthogonal diameter is defined as a minor axis.

The phrase "the active material particles exist in a state of primary particles that are not substantially aggregated" means that when the active material layer is observed with SEM, or when the active material particles are collected from the active material layer and the active material particles are observed with SEM in a state where a binder and the conductive agent are removed, a plurality of primary particles independently exist without being aggregated, or that the primary particles and other primary particles are generally not directly bonded.

The positive electrode preferably contains the active material particles and the fibrous conductive agent. The active material particles of the positive electrode usually have lower conductivity than the active material particles of the negative electrode, and the decrease in conductivity in the positive electrode has a large influence on the capacity retention ratio. Therefore, by suppressing the decrease in conductivity in the positive electrode, the capacity retention ratio after charge-discharge cycles can be effectively increased.

Hereinafter, an energy storage device according to an embodiment of the present invention will be described in detail.

<Energy Storage Device>

Figure 1:
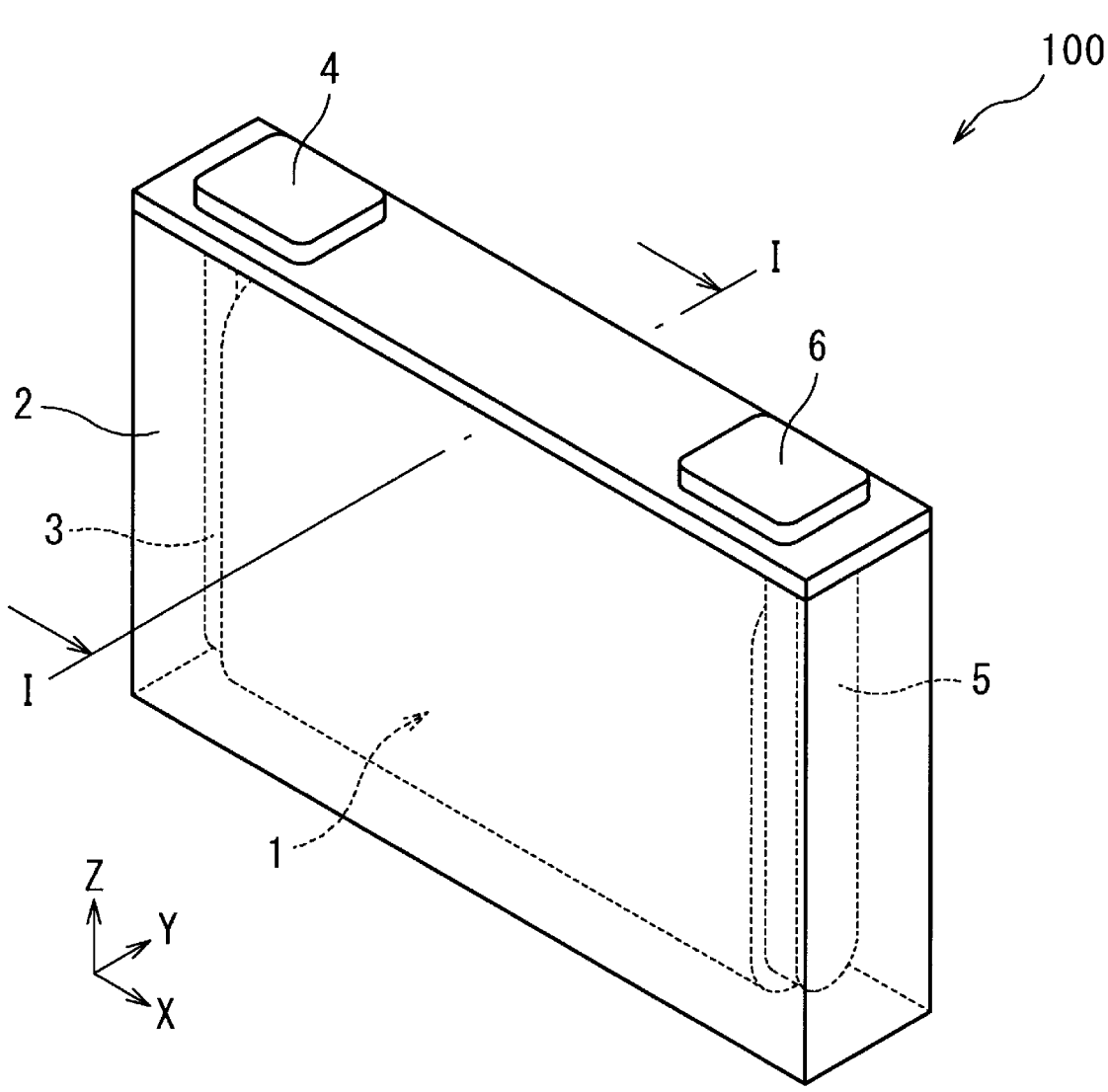
FIG. 1 is a schematic perspective view showing an energy storage device according to an embodiment of the present invention.

An energy storage device 100 according to an embodiment of the present invention as shown in FIGS. 1 and 2 includes an electrode assembly 1, a nonaqueous electrolyte (not shown), and a case 2 for housing them. FIGS. 1 and 2 do not limit orientation of the energy storage device 100 in use. For example, the energy storage device 100 in FIGS. 1 and 2 may be tilted or turned upside down for use. The energy storage device 100 is a secondary battery that is an example of the energy storage device. The electrode assembly 1 is a flat wound-type electrode assembly including a positive electrode, a negative electrode, and a separator. A specific structure of the electrode assembly 1 will be described later. The energy storage device 100 further includes a positive electrode connecting member 3, a positive electrode external terminal 4, a negative electrode connecting member 5, and a negative electrode external terminal 6. The positive electrode of the electrode assembly 1 is electrically connected to the positive electrode external terminal 4 with the positive electrode connecting member 3 interposed therebetween. The negative electrode of the electrode assembly 1 is electrically connected to the negative electrode external terminal 6 with the negative electrode connecting member 5 interposed therebetween.

(Electrode Assembly)

The electrode assembly 1 includes a positive electrode, a negative electrode, and a separator, and the positive electrode and the negative electrode are stacked on one another with the separator interposed therebetween. The electrode assembly 1 is a flat wound-type electrode assembly obtained by winding a band-shaped positive electrode and a band-shaped negative electrode stacked on one another with a band-shaped separator interposed therebetween.

The electrode assembly 1 has a flat shape, and includes a flat portion 7 where a positive electrode, a negative electrode and a separator are stacked on one another in substantially parallel, and two curved surface portions 8 (8a, 8b) where the positive electrode, the negative electrode and the separator are stacked on one another in a curved state (see FIG. 2). The curved surface portion 8 may be referred to as a curved portion or the like. The two curved surface portions 8a and 8b are positioned so as to face each other.

Length R of the periphery of the curved surface portion 8a and length R' of the periphery of the curved surface portion 8b as viewed in the winding axis direction (FIG. 2) of the electrode assembly 1 are appropriately set according to size of the energy storage device 100 or the like, and may be, for example, 5 mm or more and 100 mm or less, or may be 10 mm or more and 50 mm or less, respectively. Usually, the length R of the periphery of the curved surface portion 8a is substantially equal to the length R' of the periphery of the curved surface portion 8b.

(Case)

The case 2 is a sealed case which houses the electrode assembly 1 and the like and in which an electrolyte is enclosed. The material of the case 2 may be, for example, a resin, as long as the material has sealability capable of enclosing an electrolyte and a strength capable of protecting the electrode assembly 1.

The case 2 is a prismatic case, and an outer surface of the flat portion 7 of the electrode assembly 1 is in contact with an inner surface of the case 2. That is, thickness T of the electrode assembly 1 and the inner dimension of the case 2 may be substantially the same (see FIG. 2).

The upper curved surface portion 8a of the electrode assembly 1 in FIG. 2 and the inner surface of the case 2 are separated from each other. The distance X from the distal end of the curved surface portion 8a to the inner surface of the case 2 facing the distal end of the curved surface portion 8a as viewed in the winding axis direction (FIG. 2) of the electrode assembly 1 is appropriately set according to the size of the energy storage device 100 or the like, and may be, for example, 0.1 mm or more and 10 mm or less, or may be 0.5 mm or more and 3 mm or less.

The lower curved surface portion 8b of the electrode assembly 1 in FIG. 2 and the inner surface of the case 2 are also separated from each other. In the present embodiment, distance X' to the inner surface of the case 2 facing a distal end of the curved surface portion 8b is larger than the distance X. The distance X' may be, for example, a length within a range similar to the distance X described above.

(Positive Electrode)

The positive electrode has a positive electrode substrate and a positive active material layer stacked directly or via an intermediate layer on the positive electrode substrate.

The positive electrode substrate has conductivity. Whether or not the positive substrate has conductivity is determined with the volume resistivity of $10^7$ Ω·cm measured in accordance with JIS-H-0505 (1975) as a threshold. As the material of the positive electrode substrate, a metal such as aluminum, titanium, tantalum or stainless steel, or an alloy thereof is used. Among these materials, aluminum and aluminum alloys are preferable from the viewpoint of the balance among electric potential resistance, high conductivity, and cost. Examples of the form of formation of the positive electrode substrate include a foil and a vapor deposition film, and a foil is preferred from the viewpoint of cost. In other words, an aluminum foil is preferable as the positive electrode substrate. Examples of the aluminum or aluminum alloy include A1085, A3003, A1N30, and the like specified in JIS-H-4000 (2014) or JIS-H-4160 (2006).

The average thickness of the positive electrode substrate is preferably 3 µm or more and 50 µm or less, more preferably 5 µm or more and 40 µm or less, still more preferably 8 µm or more and 30 µm or less, and particularly preferably 10 µm or more and 25 µm or less. When the average thickness of the positive electrode substrate is within the above-described range, it is possible to increase the energy density per volume of the energy storage device while increasing the strength of the positive electrode substrate. The "average thickness" of the positive electrode substrate and the negative electrode substrate described below refers to a value obtained by dividing a cutout mass in cutout of a substrate having a predetermined area by a true density and a cutout area of the substrate.

The intermediate layer is a coating layer on the surface of the positive electrode substrate, and contains conductive particles such as carbon particles to reduce contact resistance between the positive electrode substrate and the positive active material layer. The configuration of the intermediate layer is not particularly limited, and can be formed from, for example, a composition containing a resin binder and conductive particles.

The positive active material layer is formed of a so-called positive composite containing positive active material particles. The positive active material layer preferably contains the positive active material particles and the fibrous conductive agent. The positive composite forming the positive active material layer contains arbitrary components such as a binder, a thickener, and a filler if necessary. In the present embodiment, a form in which the positive active material layer contains a fibrous conductive agent will be mainly described, but a form in which the positive active material layer does not contain a fibrous conductive agent and the negative active material layer contains a fibrous conductive agent may be adopted.

The material (type) of the positive active material constituting the positive active material particles can be appropriately selected from known positive active materials. As the positive active material for a lithium ion secondary battery, a material capable of storing and releasing lithium ions is usually used. Examples of the positive active material include lithium-transition metal composite oxides having an $\alpha$-NaFeO$_2$-type crystal structure, lithium-transition metal composite oxides having a spinel-type crystal structure, polyanion compounds, chalcogenides, and sulfur. Examples of the lithium transition metal composite oxide having an $\alpha$-NaFeO$_2$-type crystal structure include Li[Li$_x$Ni$_{1-x}$]O$_2$ ($0 \leq x \leq 0.5$), Li[Li$_x$Ni$_\gamma$Co$_{1-x-\gamma}$]O$_2$ ($0 \leq x < 0.5$, $0 < \gamma < 1$), Li[Li$_x$Co$_{1-x}$]O$_2$ ($0 \leq x < 0.5$), Li[Li$_x$Ni$_\gamma$Mn$_{1-x-\gamma}$]O$_2$ ($0 \leq x < 0.5$, $0 < \gamma < 1$), Li[Li$_x$Ni$_\gamma$Mn$_\beta$Co$_{1-x-\gamma-\beta}$]O$_2$ ($0 \leq x < 0.5$, $0 < \gamma$, $0 < \beta$, $0.5 < \gamma + \beta < 1$), and Li[Li$_x$Ni$_\gamma$Co$_\beta$Al$_{1-x-\gamma-\beta}$]O$_2$ ($0 \leq x < 0.5$, $0 < \gamma$, $0 < \beta$, $0.5 < \gamma + \beta < 1$). Examples of the lithium-transition metal composite oxides having a spinel-type crystal structure include Li$_x$Mn$_2$O$_4$ and Li$_x$Ni$_\gamma$Mn$_{2-\gamma}$O$_4$. Examples of the polyanion compounds include LiFePO$_4$, LiMnPO$_4$, LiNiPO$_4$, LiCoPO$_4$, Li$_3$V$_2$(PO$_4$)$_3$, Li$_2$MnSiO$_4$, and Li$_2$CoPO$_4$F. Examples of the chalcogenides include titanium disulfide, molybdenum disulfide, and molybdenum dioxide. Some of atoms or polyanions in these materials may be substituted with atoms or anion species composed of other elements.

As the positive active material, a lithium transition metal composite oxide is preferable, a lithium transition metal composite oxide containing nickel, cobalt, and manganese or aluminum is more preferable, and a lithium transition metal composite oxide containing nickel, cobalt, and manganese is still more preferable. The lithium transition metal composite oxide preferably has an $\alpha$-NaFeO$_2$-type crystal structure. By using such a lithium transition metal composite oxide, the energy density can be increased, and the like. In addition, in the energy storage device having a high energy density including a wound-type electrode assembly using such a positive active material, the curved surface portion is likely to expand associated with repeated charge-discharge. Therefore, when the present invention is applied to an energy storage device including a wound-type electrode assembly having such a positive active material, an advantage that the capacity retention ratio after charge-discharge cycles is increased is particularly effectively obtained.

One of the materials of the positive active material may be used singly, or two or more thereof may be used in mixture. Among them, the positive active material preferably contains the lithium transition metal composite oxide in a proportion of 50% by mass or more (preferably 70 to 100% by mass, more preferably 80 to 100% by mass) of all the positive active materials to be used, and it is more preferable to use a positive active material substantially composed only of the lithium transition metal composite oxide.

The average particle size D50 of the positive active material particles is, for example, preferably 0.1 µm or more and 20 µm or less, more preferably 1 µm or more and 12 µm or less, and still more preferably 3 µm or more and 8 µm or less. By setting the average particle size D50 of the positive active material particles in the above range, conductivity of the positive active material layer is improved, and the capacity retention ratio after charge-discharge cycles tends to be further increased. In particular, by setting the average particle size D50 (D in the formulas 1 and 2) of the positive active material particles to be equal to or less than the above upper limit, (R/D)A and A/D are increased, and even when the space between the active material particles is widened, the decrease in conductivity between the positive active material particles can be sufficiently suppressed, so that the capacity retention ratio after charge-discharge cycles of the energy storage device is further increased.

It is preferable that the positive active material particles exist in a state of secondary particles in which a ratio of the average particle size D50 to the primary particle size is 3 or less, or primary particles that are not substantially aggregated. Hereinafter, the "secondary particles in which a ratio of the average particle size D50 to the primary particle size is 3 or less, or primary particles that are not substantially aggregated" is also referred to as "single particle-based particles". The ratio of the average particle size D50 to the primary particle size in the secondary particles is preferably 2 or less, more preferably 1.5 or less, and still more preferably 1.2 or less. The lower limit of the ratio of the average particle size D 50 to the primary particle size of the secondary particles may be 1. From the difference between the method for measuring the primary particle size and the method for measuring the average particle size D50, the lower limit of the ratio of the average particle size D50 to the primary particle size of the secondary particles may be less than 1, for example, 0.9.

The positive active material particles may contain other positive active material particles other than the single particle-based particles. However, the content of the single particle-based particles with respect to all the positive active material particles contained in the positive active material layer is preferably 80% by mass or more, more preferably 90% by mass or more, still more preferably 99% by mass or more, and even more preferably substantially 100% by mass. That is, in the positive electrode, it is particularly preferable to use substantially only single particle-based particles as the positive active material particles. In such a case, an energy storage device satisfying the formulas 1 and 2 is easily obtained, and as a result, the capacity retention ratio of the energy storage device after charge-discharge cycles can be further increased.

The positive active material particles as the single particle-based particles can be produced by a known method, and the primary particle size and the average particle size D50 can be controlled by production conditions. As such positive active material particles, a commercially available product may be used. In the process of producing the active material, the plurality of primary particles can be grown to increase the particle size by increasing the firing temperature or prolonging the firing time. Alternatively, the primary particles can be formed by crushing the secondary particles.

The content of the positive active material particles in the positive active material layer is preferably 80% by mass or more and 99% by mass or less, more preferably 85% by mass or more and 98% by mass or less, and more preferably 90% by mass or more and 97% by mass or less. By setting the content of the positive active material particles in the positive active material layer in the above range, the conductivity and energy density of the positive active material layer can be increased in a well-balanced manner.

Examples of the fibrous conductive agent include a fibrous metal, a fibrous conductive resin, and fibrous carbon, and fibrous carbon is preferable. Fibrous carbon refers to a fibrous conductive agent that is a carbonaceous material. Examples of the fibrous carbon (fibrous conductive agent that is a carbonaceous material) include carbon nanofibers, pitch-based carbon fibers, and carbon nanotubes (CNT), and CNTs that are graphene-based carbon can be suitably used.

The average diameter of the fibrous conductive agent is preferably 1 nm or more and 300 nm or less, more preferably 3 nm or more and 100 nm or less, still more preferably 4 nm or more and 50 nm or less, and even more preferably 5 nm or more and 30 nm or less. When the average diameter of the fibrous conductive agent is within the above range, the conductivity of the positive active material layer is further improved, and the capacity retention ratio after charge-discharge cycles is further increased. The "average diameter" of the fibrous conductive agent is an average value of diameters of arbitrary 10 fibrous conductive agents observed with SEM or TEM.

The average length of the fibrous conductive agent is preferably larger than the average particle size D50 of the positive active material particles, and more preferably 2 times or more, 3 times or more, or 5 times or more the average particle size D50 of the positive active material particles. As described above, by using the fibrous conductive agent sufficiently longer than the size of the positive active material particles, even when the curved surface portion $8a$ of the electrode assembly 1 expands and the interval between the positive active material particles is widened, the decrease in conductivity between the positive active material particles can be particularly sufficiently suppressed by the fibrous conductive agent, so that the capacity retention ratio after charge-discharge cycles is further increased. Specifically, the average length of the fibrous conductive agent is preferably 1 μm or more and 1,000 μm or less, more preferably 10 μm or more and 600 μm or less, and still more preferably 20 μm or more and 300 μm or less.

The average aspect ratio (ratio of the average length to the average diameter) of the fibrous conductive agent is, for example, preferably 10 or more and 10,000 or less, more preferably 100 or more, and still more preferably 1,000 or more. By using the fibrous conductive agent having an average aspect ratio in the above range, the capacity retention ratio after charge-discharge cycles can be further increased.

When the fibrous conductive agent is fibrous carbon, an average lattice spacing ($d_{002}$) of a (002) plane determined by X-ray diffraction of the fibrous carbon is preferably less than 0.340 nm. When the average lattice spacing ($d_{002}$) of the fibrous carbon is small and the crystallinity is high as described above, the conductivity of the positive active material layer is further increased. The lower limit of the average lattice spacing ($d_{002}$) of the fibrous carbon can be set to, for example, 0.330 nm. A full width at half maximum (002) of a peak corresponding to the (002) plane of the fibrous carbon measured by X-ray diffraction is, for example, 0.5° or more. The full width at half maximum (002) of the fibrous carbon is preferably less than 0.7°.

Fibrous carbon can be obtained by, for example, a method in which a polymer is formed into a fibrous form by a spinning method or the like and heat-treated in an inert atmosphere, a vapor phase growth method in which an organic compound is reacted at a high temperature in the presence of a catalyst, or the like. The fibrous carbon is preferably fibrous carbon obtained by a vapor phase growth method (vapor phase growth fibrous carbon). Commercially available fibrous carbon and other fibrous conductive agents can be used.

The content of the fibrous conductive agent in the positive active material layer is, for example, preferably 0.01% by mass or more and 5% by mass or less, preferably 0.1% by mass or more and 4% by mass or less, more preferably 0.5% by mass or more and 3% by mass or less, and still more preferably 1.0% by mass or more and 2.5% by mass or less. By setting the content of the fibrous conductive agent to be equal to or greater than the lower limit, the capacity retention ratio after charge-discharge cycles can be further increased. On the other hand, by setting the content of the fibrous conductive agent to be equal to or less than the above upper limit, the content of the positive active material particles can be relatively increased and the energy density can be increased while sufficiently increasing the capacity retention ratio after charge-discharge cycles. In addition, by setting the content of the fibrous conductive agent to be equal to or less than the above upper limit, production cost can also be suppressed.

It is preferable that the fibrous conductive agent exists over the entire length of the curved surface portion $8a$ of the electrode assembly 1 as viewed in the winding axis direction, and forms a network of the fibrous conductive agent along the shape of the positive active material particles present on the surface of the positive active material layer. That is, the conductivity of the surface of the positive active material layer in the curved surface portion 8a of the electrode assembly 1 is preferably secured by the plurality of fibrous conductive agents from one end to the other end of the periphery of the curved surface portion 8a as viewed in the winding axis direction. In addition, the fibrous conductive agent is preferably oriented in the length direction of the band-shaped positive electrode (positive active material layer), that is, the length direction of the periphery of the curved surface portion 8a. As a result, when the curved surface portion 8a expands, the fibrous conductive agent easily extends, and the conductivity can be maintained more sufficiently. The fibrous conductive agent can be oriented in a desired direction by adjusting the direction of coating or pressing.

The positive active material layer preferably further contains a conductive agent other than the fibrous conductive agent. Examples of the other conductive agent include a granular conductive agent. The granular conductive agent refers to a conductive agent having a shape in which the ratio of the major axis to the minor axis is, for example, 1 or more and less than 10. The minor axis and major axis of the granular conductive agent are values measured in an SEM or TEM image on the surface of the positive active material layer. The shortest diameter passing through the center of the minimum circumscribed circle of the granular conductive agent is defined as a minor axis, and the diameter passing through the center and orthogonal to the minor axis is defined as a major axis. When there are two or more shortest diameters, a shortest diameter with the longest orthogonal diameter is defined as a minor axis. The granular conductive agent may be a granular conductive agent that is not substantially deformed.

Examples of the granular conductive agent include a granular metal, a granular conductive resin, a granular conductive ceramic, and granular carbon, and granular carbon is preferable. The granular carbon refers to a granular conductive agent that is a carbonaceous material. Examples of the granular carbon (granular conductive agent that is a carbonaceous material) include graphitic carbon, non-graphitic carbon, and graphene-based carbon. Examples of the non-graphitic carbon include carbon black. Examples of the carbon black include furnace black, acetylene black, and ketjen black. Examples of the graphene-based carbon include graphene and fullerene. Among them, non-graphitic carbon is preferable, and carbon black is more preferable.

The granular conductive agent is composed of primary particles, and the primary particles are preferably present in an aggregated state. The average particle size of the primary particles of the granular conductive agent is, for example, 10 nm or more and 500 nm or less, and more preferably 20 nm or more and 100 nm or less. By using the granular conductive agent having such a size, voids between the positive active material particles can be effectively filled, the conductivity of the positive active material layer can be further increased, and the capacity retention ratio after charge-discharge cycles can be further increased. The "average particle size" of the granular conductive agent is an average value of particle sizes of arbitrary 10 granular conductive agents observed with SEM or TEM. The particle size of the granular conductive agent is an average value of the major axis and the minor axis.

The content of the granular conductive agent in the positive active material layer is preferably 0.1% by mass or more and 10% by mass or less, and more preferably 1% by mass or more and 6% by mass or less. By setting the content of the granular conductive agent in the positive active material layer to be equal to or greater than the lower limit, the conductivity of the positive active material layer can be further increased, and the capacity retention ratio after charge-discharge cycles can be further increased. On the other hand, by setting the content of the granular conductive agent to be equal to or less than the above upper limit, the content of the positive active material particles can be relatively increased and the energy density can be increased.

Examples of the binder include a solvent-based binder and an aqueous binder, and a solvent-based binder is preferable. The solvent-based binder refers to a binder that is dispersed or dissolved in an organic solvent.

Examples of the solvent-based binder include fluororesins (polytetrafluoroethylene (PTFE), polyvinylidene fluoride (PVDF), and the like), thermoplastic resins such as polyethylene, polypropylene and polyimide, copolymers of vinylidene fluoride and hexafluoropropylene, copolymers of ethylene and vinyl alcohol, polyacrylonitrile, polyphosphazene, polysiloxane, polyvinyl acetate, polymethyl methacrylate, polystyrene, polycarbonate, polyamide, polyamideimide, crosslinked polymers of cellulose and chitosan pyrrolidone carboxylate, and derivatives of chitin or chitosan, and fluororesins are preferable, and PVDF is more preferable. One or two or more of the binders can be used.

The content of the binder in the positive active material layer is preferably 0.3 mass % or more and 10 mass % or less, more preferably 0.5 mass % or more and 8 mass % or less, and still more preferably 5 mass % or less in some cases. By setting the content of the binder to be equal to or greater than the lower limit, the positive active material particles can be stably held. In addition, by setting the content of the binder to be equal to or less than the above upper limit, the content of the positive active material particles can be increased, and the energy density can be increased.

Examples of the thickener include polysaccharide polymers such as carboxymethylcellulose (CMC) and methylcellulose. Also, when the thickener includes a functional group that is reactive with lithium, it is preferable to deactivate this functional group by methylation and the like in advance. In the case of using a thickener, the content of the thickener in the positive active material layer is preferably 5% by mass or less, and more preferably 1% by mass or less. The technique disclosed herein can be preferably carried out in an aspect in which the positive active material layer contains no thickener.

The filler is not particularly limited. Examples of the filler include polyolefins such as polypropylene and polyethylene, inorganic oxides such as silicon dioxide, aluminum oxide, titanium dioxide, calcium oxide, strontium oxide, barium oxide, magnesium oxide and aluminosilicate, carbonates such as calcium carbonate, hardly soluble ionic crystals of calcium fluoride, barium fluoride, and barium sulfate, nitrides such as aluminum nitride and silicon nitride, and substances derived from mineral resources, such as talc, montmorillonite, boehmite, zeolite, apatite, kaolin, mullite, spinel, olivine, sericite, bentonite and mica, or artificial products thereof. In the case of using a filler, the content of the filler in the positive active material layer is preferably 5% by mass or less, and more preferably 1% by mass or less. The technique disclosed herein can be preferably carried out in an aspect in which the positive active material layer does not contain a filler.

The positive active material layer may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Nb, or W as a component other than the positive active material particles, the conductive agent (fibrous conductive agent or the like), the binder, the thickener, and the filler.

The surface roughness Ra of the positive active material layer is preferably 0.5 µm or more and 3.0 µm or less, more preferably 1.0 µm or more and 2.0 µm or less, and still more preferably 1.3 µm or more. By setting the surface roughness Ra (A in the formulas 1 and 2) of the positive active material layer to be equal to or greater than the lower limit, (R/D)A and A/D increase, and even when the space between the active material particles is widened, the decrease in conductivity between the positive active material particles can be sufficiently suppressed, so that the capacity retention ratio after charge-discharge cycles of the energy storage device is further increased. The surface roughness Ra of the positive active material layer can be adjusted by the type and size of the positive active material particles, pressing to the positive active material layer in the production process, the pressure thereof, and the like.

(Formula 1)

In the energy storage device 100 according to an embodiment of the present invention, the following formula 1 is satisfied:

$$(R/D)A \geq 2X \qquad 1$$

wherein X is a distance from a distal end of one curved surface portion 8a as viewed in the winding axis direction (FIG. 2) of the electrode assembly 1 to an inner surface of the case 2 facing the distal end of the curved surface portion 8a, R is a length of a periphery of one curved surface portion 8a as viewed in the winding axis direction of the electrode assembly 1, D is an average particle size D50 of the positive active material particles, and A is a surface roughness Ra of the positive active material layer.

(R/D)A is preferably 3X or more, more preferably 3.5X or more, and still more preferably 3.8X or more. By relatively enlarging (R/D)A with respect to X, the fibrous conductive agent sufficiently extends even when the distal end of the curved surface portion 8a of the electrode assembly 1 expands until coming into contact with the inner surface of the case 2, whereby the decrease in conductivity between the positive active material particles can be suppressed, so that the capacity retention ratio of the energy storage device 100 after charge-discharge cycles is increased.

On the other hand, (R/D)A is, for example, preferably 20X or less, and more preferably 15X or less or 10X or less in some cases. By setting (R/D)A to be equal to or less than the above upper limit, a space where the electrode assembly 1 is not arranged in the case 2 becomes relatively small, and an energy density of the energy storage device 100 can be increased.

(Formula 2)

In the energy storage device 100 according to an embodiment of the present invention, the following formula 2 is satisfied:

$$A/D \geq 0.2 \qquad 2$$

wherein D is the average particle size D50 of the positive active material particles, and A is the surface roughness Ra of the positive active material layer.

A/D is preferably 0.25 or more, and more preferably 0.26 or more. By increasing A/D, the fibrous conductive agent sufficiently extends even when the curved surface portion 8a of the electrode assembly 1 expands, whereby the decrease in conductivity between the positive active material particles can be suppressed, so that the capacity retention ratio of the energy storage device 100 after charge-discharge cycles is increased. On the other hand, A/D may be, for example, 0.5 or less, 0.4 or less, or 0.30 or less.

(Formula 3)

In the energy storage device 100 according to an embodiment of the present invention, the following formula 3 is preferably satisfied:

$$0.06 \leq X/R \leq 0.12 \qquad 3$$

wherein X is the distance from the distal end of one curved surface portion 8a as viewed in the winding axis direction of the electrode assembly 1 to the inner surface of the case 2 facing the distal end of the curved surface portion 8a, and R is the length of the periphery of one curved surface portion 8a as viewed in the winding axis direction of the electrode assembly 1, X/R is more preferably 0.07 or more. By setting X/R to be equal to or greater than the lower limit, it becomes difficult for the curved surface portion 8a to come into contact with the inner surface of the case 2 even when the curved surface portion 8a expands, and an increase in resistance can be suppressed due to compression of the separator in the curved surface portion 8a.

On the other hand, X/R is more preferably 0.10 or less, and still more preferably 0.08 or less. By setting X/R to be equal to or less than the above upper limit, a space that does not contribute to charge-discharge in the case 2 is reduced, and the energy density is increased.

Also, X'/R' is preferably 0.12 or less, more preferably 0.10 or less, and still more preferably 0.08 or less also in a relationship between the distance X' from the distal end of the other curved surface portion 8b as viewed in the winding axis direction of the electrode assembly 1 to the inner surface of the case 2 facing the distal end of the curved surface portion 8b and the length R' of the periphery of the other curved surface portion 8b as viewed in the winding axis direction of the electrode assembly 1. By setting X'/R' to be equal to or less than the above upper limit, a space that does not contribute to charge-discharge in the case 2 is reduced, and the energy density is increased. In addition, also in a case where X is replaced with X' and R is replaced with R' in the above formula 1 or 3, it is preferable to satisfy the above formula 1 or 3. In this case, since both of the two curved surface portions 8a and 8b are in a suitable state, the capacity retention ratio or the like of the energy storage device 100 after charge-discharge cycles is further improved.

(Negative Electrode)

The negative electrode has a negative electrode substrate and a negative active material layer stacked directly or via an intermediate layer on the negative electrode substrate. The intermediate layer may have the same configuration as the intermediate layer of the positive electrode.

Although the negative electrode substrate may have the same configuration as that of the positive electrode substrate, as the material, metals such as copper, nickel, stainless steel, and nickel-plated steel or alloys thereof are used, and copper or a copper alloy is preferable. More specifically, the negative electrode substrate is preferably a copper foil. Examples of the copper foil include a rolled copper foil and an electrolytic copper foil.

The average thickness of the negative electrode substrate is preferably 2 μm or more and 35 μm or less, more preferably 3 μm or more and 30 μm or less, still more preferably 4 μm or more and 25 μm or less, and particularly preferably 5 μm or more and 20 μm or less. When the average thickness of the negative electrode substrate falls within the above-described range, it is possible to increase the energy density per volume of the energy storage device while increasing the strength of the negative electrode substrate.

The negative active material layer is generally formed of a so-called negative composite containing a negative active material. The negative composite forming the negative active material layer contains optional components such as a conductive agent, a binder, a thickener, a filler, or the like as necessary. As the optional components such as a conductive agent, a binder, a thickener, and a filler, the same components as those in the positive active material layer can be used. Also, in an embodiment of the present invention, the conductive agent used in the negative active material layer may be one or both of a fibrous conductive agent and a granular conductive agent, may be another conductive agent, and may be a fibrous conductive agent. The negative active material layer may be a layer substantially composed of only a negative active material such as metallic Li.

The negative active material layer may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Ta, Hf, Nb, or W as a component other than the negative active material, the conductive agent, the binder, the thickener, and the filler.

The negative active material can be appropriately selected from known negative active materials. For example, as the negative active material for a lithium ion secondary battery, a material capable of occluding and releasing lithium ions is usually used. Examples of the negative active material include: metallic Li; metals or metalloids such as Si and Sn; metal oxides or metalloid oxides such as a Si oxide, a Ti oxide, and a Sn oxide; titanium-containing oxides such as $Li_4Ti_5O_{12}$, $LiTiO_2$, and $TiNb_2O_7$; a polyphosphoric acid compound; silicon carbide; and carbon materials such as graphite and non-graphitic carbon (easily graphitizable carbon or hardly graphitizable carbon). Among these materials, graphite and non-graphitic carbon are preferable. In the negative active material layer, one of these materials may be used singly, or two or more of these materials may be used in mixture.

The term "graphite" refers to a carbon material in which an average grid distance ($d_{002}$) of a (002) plane determined by X-ray diffraction before charge-discharge or in a discharged state is 0.33 nm or more and less than 0.34 nm. Examples of the graphite include natural graphite and artificial graphite. Artificial graphite is preferable from the viewpoint that a material having stable physical properties can be obtained.

The term "non-graphitic carbon" refers to a carbon material in which the average lattice distance ($d_{002}$) of the (002) plane determined by X-ray diffraction before charge-discharge or in the discharged state is 0.34 nm or more and 0.42 nm or less. Examples of the non-graphitic carbon include hardly graphitizable carbon and easily graphitizable carbon. Examples of the non-graphitic carbon include a resin-derived material, a petroleum pitch or a material derived from petroleum pitch, a petroleum coke or a material derived from petroleum coke, a plant-derived material, and an alcohol derived material.

In this regard, the "discharged state" of the carbon material means a state where lithium ions that can be occluded and released in association with charge-discharge are sufficiently released from the carbon material that is the negative active material. For example, the "discharged state" refers to a state where an open circuit voltage is 0.7 V or higher in a half cell that has, for use as a working electrode, a negative electrode containing a carbon material as a negative active material, and has metal Li for use as a counter electrode.

The "hardly graphitizable carbon" refers to a carbon material in which the $d_{002}$ is 0.36 nm or more and 0.42 nm or less.

The "easily graphitizable carbon" refers to a carbon material in which the $d_{002}$ is 0.34 nm or more and less than 0.36 nm.

The negative active material may exist as negative active material particles. In this case, the average particle size of the negative active material particles can be, for example, 1 nm or more and 100 μm or less. When the negative active material is, for example, a carbon material, a titanium-containing oxide, a polyphosphoric acid compound, or the like, the average particle size D50 thereof may be preferably 1 μm or more and 100 μm or less. When the negative active material is Si, Sn, an oxide of Si, an oxide of Sn, or the like, the average particle size D50 thereof may be preferably 1 nm or more and 1 μm or less in some cases. By setting the average particle size D50 of the negative active material particles to be equal to or greater than the lower limit, the negative active material particles are easily produced or handled. By setting the average particle size D50 of the negative active material particles to be equal to or less than the upper limit, the electron conductivity of the negative active material layer is improved. A crusher, a classifier, or the like is used to obtain negative active material particles with a predetermined particle size. When the negative active material is metallic Li, the form may be foil-shaped or plate-shaped.

The content of the negative active material in the negative active material layer is preferably 60% by mass or more and 99% by mass or less, more preferably 90% by mass or more and 98% by mass or less, for example, when the negative active material layer is formed of a negative composite. When the content of the negative active material is in the above range, it is possible to achieve both high energy density and productivity of the negative active material layer. When the negative active material is metallic Li, the content of the negative active material in the negative active material layer may be 99% by mass or more, and may be 100% by mass.

(Separator)

The separator can be appropriately selected from known separators. As the separator, for example, a separator composed of only a substrate layer, a separator in which a heat resistant layer containing heat resistant particles and a binder is formed on one surface or both surfaces of the substrate layer, or the like can be used. Examples of the form of the substrate layer of the separator include a woven fabric, a nonwoven fabric, and a porous resin film. Among these forms, a porous resin film is preferable from the viewpoint of strength, and a nonwoven fabric is preferable from the viewpoint of liquid retaining property of the electrolyte. As the material of the substrate layer of the separator, a polyolefin such as polyethylene or polypropylene is preferable from the viewpoint of a shutdown function, and polyimide, aramid or the like is preferable from the viewpoint of resistance to oxidation and decomposition. As the substrate layer of the separator, a material obtained by combining these resins may be used.

The heat resistant particles included in the heat resistant layer preferably have a mass loss of 5% or less in the case of heating from room temperature to 500° C. under the atmosphere, and more preferably have a mass loss of 5% or less in the case of heating from room temperature to 800° C. under the atmosphere. Inorganic compounds can be mentioned as materials whose mass loss is less than or equal to a predetermined value when the materials are heated. Examples of the inorganic compound include: oxides such as iron oxide, silicon oxide, aluminum oxide, titanium oxide, zirconium oxide, calcium oxide, strontium oxide, barium oxide, magnesium oxide, and aluminosilicate; hydroxides such as magnesium hydroxide, calcium hydroxide, and aluminum hydroxide; nitrides such as aluminum nitride and silicon nitride; carbonates such as calcium carbonate; sulfates such as barium sulfate; hardly soluble ionic crystals such as calcium fluoride, barium fluoride, and barium titanate; covalently bonded crystals such as silicon and diamond; and substances derived from mineral resources, such as talc, montmorillonite, boehmite, zeolite, apatite, kaolin, mullite, spinel, olivine, sericite, bentonite and mica, and artificial products thereof. As the inorganic compound, a simple substance or a complex of these substances may be used alone, or two or more thereof may be mixed and used. Among these inorganic compounds, silicon oxide, aluminum oxide, or aluminosilicate is preferable from the viewpoint of safety of the energy storage device.

The porosity of the separator is preferably 80% by volume or less from the viewpoint of strength, and is preferably 20% by volume or more from the viewpoint of discharge performance. The term "porosity" herein is a volume-based value, and means a value measured with a mercury porosimeter.

As the separator, a polymer gel composed of a polymer and a nonaqueous electrolyte may be used. Examples of the polymer include polyacrylonitrile, polyethylene oxide, polypropylene oxide, polymethyl methacrylate, polyvinyl acetate, polyvinylpyrrolidone, and polyvinylidene fluoride. The use of the polymer gel has the effect of suppressing liquid leakage. As the separator, a polymer gel may be used in combination with a porous resin film, a nonwoven fabric, or the like as described above.

(Electrolyte)

The electrolyte can be appropriately selected from known electrolytes. Hereinafter, the nonaqueous electrolyte will be mainly described. As the nonaqueous electrolyte, a nonaqueous electrolyte solution may be used. The nonaqueous electrolyte solution contains a nonaqueous solvent and an electrolyte salt dissolved in the nonaqueous solvent.

The nonaqueous solvent can be appropriately selected from known nonaqueous solvents. Examples of the nonaqueous solvent include cyclic carbonates, chain carbonates, carboxylic acid esters, phosphoric acid esters, sulfonic acid esters, ethers, amides, and nitriles. As the nonaqueous solvent, those in which some hydrogen atoms contained in these compounds are substituted with halogen may be used.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, 1-phenylvinylene carbonate, and 1,2-diphenylvinylene carbonate. Among these examples, EC is preferable.

Examples of the chain carbonate include diethyl carbonate (DEC), dimethyl carbonate (DMC), ethyl methyl carbonate (EMC), diphenyl carbonate, trifluoroethyl methyl carbonate, and bis(trifluoroethyl)carbonate. Among these examples, DMC and EMC are preferable.

As the nonaqueous solvent, it is preferable to use at least one of the cyclic carbonate and the chain carbonate, and it is more preferable to use the cyclic carbonate and the chain carbonate in combination. By using the cyclic carbonate, dissociation of the electrolyte salt can be promoted to improve the ionic conductivity of the nonaqueous electrolyte solution. By using the chain carbonate, the viscosity of the nonaqueous electrolyte solution can be kept low. When the cyclic carbonate and the chain carbonate are used in combination, a volume ratio of the cyclic carbonate to the chain carbonate (cyclic carbonate:chain carbonate) is preferably in a range from 5:95 to 50:50, for example.

The electrolyte salt can be appropriately selected from known electrolyte salts. Examples of the electrolyte salt include a lithium salt, a sodium salt, a potassium salt, a magnesium salt, and an onium salt. Among these salts, the lithium salt is preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a halogenated hydrocarbon group, such as $LiSO_3CF_3$, $LiN(SO_2CF_3)_2$, $LiN(SO_2C_2F_5)_2$, $LiN(SO_2CF_3)(SO_2C_4F)$, $LiC(SO_2CF_3)_3$ and $LiC(SO_2C_2F_5)_3$. Among these salts, an inorganic lithium salt is preferable, and $LiPF_6$ is more preferable.

The content of the electrolyte salt in the nonaqueous electrolyte solution is preferably 0.1 mol/km$^3$ or more and 2.5 mol/dm$^3$ or less, more preferably 0.3 mol/dm$^3$ or more and 2.0 mol/km$^3$ or less, still more preferably 0.5 mol/dm$^3$ or more and 1.7 mol/dm$^3$ or less, and particularly preferably 0.7 mol/dm$^3$ or more and 1.5 mol/dm$^3$ or less. When the content of the electrolyte salt is in the above range, it is possible to increase the ionic conductivity of the nonaqueous electrolyte solution.

The nonaqueous electrolyte solution may contain an additive.

Examples of the additive include aromatic compounds such as biphenyl, alkylbiphenyl, terphenyl, partly hydrogenated terphenyl, cyclohexylbenzene, t-butylbenzene, t-amylbenzene, diphenyl ether, and dibenzofuran; partial halides of the aromatic compounds such as 2-fluorobiphenyl, o-cyclohexylfluorobenzene, and p-cyclohexylfluorobenzene; halogenated anisole compounds such as 2,4-difluoroanisole, 2,5-difluoroanisole, 2,6-difluoroanisole, and 3,5-difluoroanisole; succinic anhydride, glutaric anhydride, maleic anhydride, citraconic anhydride, glutaconic anhydride, itaconic anhydride, and cyclohexanedicarboxylic anhydride; ethylene sulfite, propylene sulfite, dimethyl sulfite, dimethyl sulfate, ethylene sulfate, sulfolane, dimethyl sulfone, diethyl sulfone, dimethylsulfoxide, diethylsulfoxide, tetramethylene sulfoxide, diphenyl sulfide, 4,4'-bis(2,2-dioxo-1,3,2-dioxathiolane, 4-methylsulfonyloxymethyl-2,2-dioxo-1,3,2-dioxathiolane, thioanisole, diphenyl disulfide, dipyridinium disulfide, perfluorooctane, tristrimethylsilyl borate, tristrimethylsilyl phosphate, and tetrakistrimethylsilyl titanate. One of these additives may be used singly, or two or more thereof may be used in mixture.

The content of the additive contained in the nonaqueous electrolyte solution is preferably 0.01% by mass or more and 10% by mass or less, more preferably 0.1% by mass or more and 7% by mass or less, still more preferably 0.2% by mass or more and 5% by mass or less, and particularly preferably 0.3% by mass or more and 3% by mass or less, with respect to a total mass of the nonaqueous electrolyte solution. When the content of the additive falls within the above range, it is possible to improve capacity retention performance or charge-discharge cycle performance after high-temperature storage, and to further improve safety.

As the nonaqueous electrolyte, a solid electrolyte may be used, or a nonaqueous electrolyte solution and a solid electrolyte may be used in combination.

The solid electrolyte can be selected from any material having ionic conductivity such as lithium, sodium and calcium and being solid at room temperature (for example, 20° C.). Examples of the solid electrolyte include sulfide solid electrolytes, oxide solid electrolytes, oxynitride solid electrolytes, and polymer solid electrolytes.

Examples of the lithium ion secondary battery include $Li_2S$—$P_2S_5$, LiI—$Li_2S$—$P_2S_5$, and $L_{10}Ge$—$P_2S_{12}$ as the sulfide solid electrolyte.

(Application and the Like)

The energy storage device of the present embodiment is an energy storage device having high energy density, and can be particularly suitably applied to an energy storage device in a use form in which charging and discharging are repeated at high current density. This is because in such an energy storage device, expansion of the curved surface portion of the electrode assembly is likely to occur due to repeated charge-discharge, and a decrease in the capacity retention ratio accompanying the expansion becomes remarkable. Specifically, the energy storage device of the present embodiment can be particularly suitably used as a power source for motor vehicles such as electric vehicles (EV), hybrid electric vehicles (HEV), and plug-in hybrid electric vehicles (PHEV), or the like.

The energy storage device of the present embodiment can be suitably applied to an energy storage device in which the expansion in the thickness direction (Y-direction in FIGS. 1 and 2) of the case is restricted or the case is pressed in the thickness direction. This is because, in such an energy storage device, the flat portion of the electrode assembly is particularly unlikely to expand, so that the decrease in the capacity retention ratio due to the expansion of the curved surface portion of the electrode assembly becomes remarkable. The case can be pressed in the thickness direction by, for example, a pressurizing member that pressurizes the case 2 from the outside. That is, the energy storage device of the present embodiment can further include a pressurizing member. Examples of the pressurizing member include a restraining band or a metallic frame. The plurality of energy storage devices may be arranged side by side in the thickness direction, and fixed with the use of a frame or the like with the plurality of energy storage devices pressurized from both ends in the thickness direction.

(Manufacturing Method)

The energy storage device 100 can be manufactured by a conventionally known method. The energy storage device 100 can be manufactured by a manufacturing method including, for example, preparing a positive electrode, preparing a negative electrode, preparing a separator, preparing an electrolyte, stacking and winding the positive electrode and the negative electrode with the separator interposed therebetween to form the flat electrode assembly 1, housing the electrode assembly 1 in the case 2, and injecting the electrolyte into the case 2.

<Configuration of Energy Storage Apparatus>

The energy storage device according to the present embodiment can be mounted as an energy storage unit (battery module) configured by assembling a plurality of energy storage devices on a power source for automobiles such as EV, HEV, and PHEV, a power source for electronic devices such as personal computers and communication terminals, or a power source for power storage, or the like. In this case, the technique according to an embodiment of the present invention may be applied to at least one energy storage device included in the energy storage unit.

Figure 4:
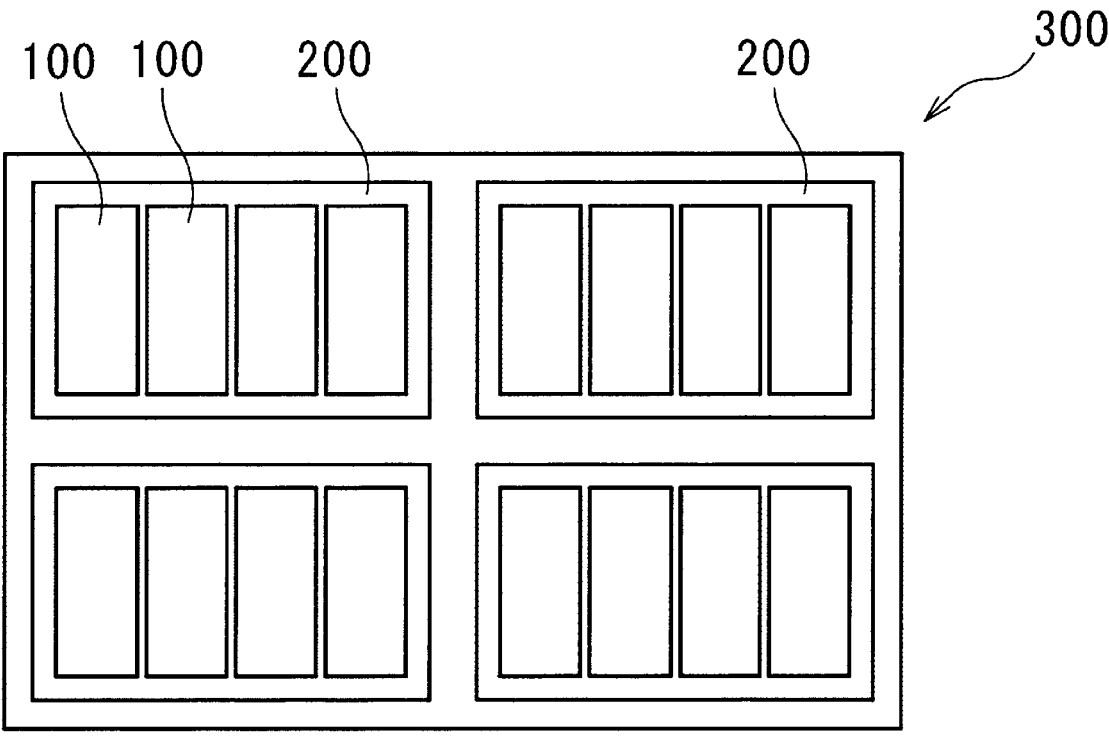
FIG. 4 is a schematic view illustrating an energy storage apparatus configured by aggregating a plurality of energy storage devices according to an embodiment of the present invention.

FIG. 4 illustrates an example of an energy storage apparatus 300 formed by assembling energy storage units 200 in each of which two or more electrically connected energy storage devices 100 are assembled. The energy storage apparatus 300 may include a busbar (not illustrated) for electrically connecting the two or more energy storage devices 100, a busbar (not illustrated) for electrically connecting the two or more energy storage units 200, and the like. The energy storage unit 200 or the energy storage apparatus 300 may include a state monitor (not illustrated) for monitoring the state of one or more energy storage devices.

OTHER EMBODIMENTS

The present invention is not limited to the above embodiments, and various modifications may be made without departing from the gist of the present invention. For example, to the configuration of an embodiment, the configuration of another embodiment can be added, and a part of the configuration of an embodiment can be replaced by the configuration of another embodiment or a well-known technique. Furthermore, a part of the configuration according to one embodiment can be removed. In addition, a well-known technique can be added to the configuration according to one embodiment.

In the above embodiment, it has been described that the positive active material layer contains a fibrous conductive agent, D in the formulas 1 and 2 is the average particle size D50 of the positive active material particles, and A is the surface roughness Ra of the positive active material layer, but the present invention is not limited thereto. That is, the form of the energy storage device in which the negative active material layer contains a fibrous conductive agent, D in the formula 1 and 2 is the average particle size D50 of the negative active material particles, A is the surface roughness Ra of the negative active material layer, and at least one of the formulas 1 and 2 is satisfied is also within the scope of the present invention. In addition, the technique according to an embodiment of the present invention may be applied to both the positive active material layer and the negative active material layer.

Also, in the energy storage device 100 shown in FIG. 2, the distance X from the distal end of the upper curved surface portion 8a to the inner surface of the case 2 facing the distal end of the curved surface portion 8a is shorter than the distance X' from the distal end of the lower curved surface portion 8b to the inner surface of the case 2 facing the distal end of the curved surface portion 8b, but the present invention is not limited to such a shape. However, when the distance from the distal end of the lower curved surface portion 8b to the inner surface of the case 2 facing the distal end of the curved surface portion 8b is shorter, the formulas 1 and 3 are applied, where X is the distance from the distal end of the lower curved surface portion 8b to the inner surface of the case 2 facing the distal end of the curved surface portion 8b, and R is the length of the periphery of the curved surface portion 8b as viewed in the winding axis direction of the electrode assembly 1. Further, the distance X from the distal end of the upper curved surface portion 8a to the inner surface of the case 2 facing the distal end of the curved surface portion 8a may be equal to the distance X' from the distal end of the lower curved surface portion 8b to the inner surface of the case 2 facing the distal end of the curved surface portion 8b.

In the above embodiment, although the case where the energy storage device is used as a chargeable and dischargeable secondary battery (for example, lithium ion secondary battery) has been described, the type, shape, size, capacity, and the like of the energy storage device are arbitrary. The energy storage device of the present invention can also be applied to capacitors such as various secondary batteries, electric double layer capacitors, and lithium ion capacitors. Also, the shape and the like of the case of the energy storage device are not particularly limited.

EXAMPLES

Hereinafter, the present invention will be described in more detail with reference to examples, but the present invention is not limited to the following examples. All the measured values in the following examples were measured by the above-described method.

The positive active material particles used are shown below.

Positive active material particles A: $LiNi_{0.6}Co_{0.2}Mn_{0.2}O_2$ particles as a positive active material Primary particle size: 5.0 μm, average particle size (D50): 5.0 μm, average particle size (D50)/primary particle size=1.0

Positive active material particles B: $LiNi_{0.6}Co_{0.2}Mn_{0.2}O_2$ particles as a positive active material Primary particle size: 0.6 μm, average particle size (D50): 8.5 μm, average particle size (D50)/primary particle size=14

Example 1

(Fabrication of Positive Electrode)

A positive composite paste containing the positive active material particles A as positive active material particles, CNTs (average diameter: 7 nm, average length: about 60 to 100 μm) as a fibrous conductive agent, acetylene black (AB) as a granular conductive agent, and polyvinylidene fluoride (PVDF) as a binder in a mass ratio (in terms of solid content) of 94.5:1.5:2.5:1.5 and containing N-methyl-pyrrolidone (NMP) as a dispersion medium was prepared. The positive composite paste was applied onto a surface of an aluminum foil that served as a positive electrode substrate, and was dried to prepare a positive active material layer. Thereafter, roll pressing was performed to obtain a positive electrode of Example 1. The obtained positive active material layer of the positive electrode of Example 1 had a surface roughness Ra of 1.3 μm.

(Fabrication of Negative Electrode)

A negative composite paste was prepared, which contained graphite as a negative active material, styrene butadiene rubber (SBR) as a binder, and carboxymethyl cellulose (CMC) as a thickener at a mass ratio of 96:3:1 (in terms of solid content) with water as a dispersion medium. The negative composite paste was applied onto a surface of a copper foil that served as a negative electrode substrate, and was dried to form a negative active material layer. Thereafter, roll pressing was performed to obtain a negative electrode.

(Assembly of Secondary Battery)

A flat wound-type electrode assembly was prepared using the positive electrode, the negative electrode, and a polyolefin microporous membrane as a separator. The electrode assembly was housed in a prismatic case, and a nonaqueous electrolyte was injected into the case to assemble a secondary battery (energy storage device) of Example 1. As a nonaqueous electrolyte, a solution obtained by dissolving lithium hexafluorophosphate ($LiPF_6$) as an electrolyte salt in a nonaqueous solvent obtained by mixing EC (ethylene carbonate), EMC (ethylmethyl carbonate), and dimethyl carbonate (DMC) at a volume ratio of 30:35:35 at a concentration of 1.0 mol/km³ was used.

The length (R) of the periphery of the curved surface portion as viewed in the winding axis direction of the electrode assembly of the obtained secondary battery of Example 1 was 25.8 mm, and the distance (X) from the distal end of the curved surface portion to the inner surface of the case facing the curved surface portion was 1.7 mm.

Comparative Example 1

A positive electrode and a secondary battery of Comparative Example 1 were obtained similarly as in Example 1 except that CNTs were not used and the mass ratio of the positive active material particles A, AB, and the binder was 94.5:4.0:1.5 in the preparation of the positive composite paste. The obtained positive active material layer of the positive electrode of Comparative Example 1 had a surface roughness Ra of 1.2 μm.

Comparative Example 2

A positive electrode and a secondary battery of Comparative Example 2 were obtained similarly as in Example 1 except that the positive active material particles B were used instead of the positive active material particles A in the preparation of the positive composite paste. The obtained positive active material layer of the positive electrode of Comparative Example 2 had a surface roughness Ra of 1.0 μm.

Comparative Example 3

A positive electrode and a secondary battery of Comparative Example 3 were obtained similarly as in Comparative Example 1 except that the positive active material particles B were used instead of the positive active material particles A in the preparation of the positive composite paste. The obtained positive active material layer of the positive electrode of Comparative Example 3 had a surface roughness Ra of 1.0 μm.

In each of the obtained secondary batteries of Comparative Examples 1 to 3, the length (R) of the periphery of the curved surface portion as viewed in the winding axis direction of the electrode assembly was 25.8 mm, and the distance (X) from the distal end of the curved surface portion to the inner surface of the facing case was 1.7 mm.

[Evaluation]

(Charge-Discharge Cycle Test)

Each of the obtained secondary batteries was subjected to the following charge-discharge cycle test. After storage in a thermostatic bath at 60° C. for 3 hours, constant current charge was performed up to 4.20 V at a current value of 1.0 C, and then constant voltage charge was performed at 4.2 V. With regard to the charge termination conditions, charge was performed until the total charge time reached 3 hours. Thereafter, a pause time of 10 minutes was provided. Constant current discharge was performed up to 2.50 V at a current value of 1.0 C, and then a pause period of 10 minutes was provided. The charging and discharging steps constituted one cycle, and the cycle was performed 700 cycles. The charging, discharging and pausing were performed in a thermostatic bath at 60° C.

(Capacity Retention Ratio)

The ratio of the discharge capacity of the 700th cycle to the discharge capacity of the 1st cycle in the charge-discharge cycle test was obtained as the discharge capacity retention ratio. The results are shown in Table 1.

TABLE 1

| | Positive electrode active material layer | | | Electrode assembly | | | | | | Evaluation |
| | Positive electrode active material particles | | | | curved portion | | | | | |
| | | | Conductive | Surface | Peripheral | Distance to inner | Formula 1 | | Capacity |
| | Type | Average particle size D50 (D)/μm | agent Type | roughness Ra (A)/μm | length (R)/mm | surface of case (X)/mm | (R/D)A/ mm | 2X/ mm | Formula 2 A/D | Formula 3 X/R | retention ratio/% |
|---|---|---|---|---|---|---|---|---|---|---|---|
| Example 1 | Particle A | 5.0 | AB/CNT | 1.3 | 25.8 | 1.7 | 6.7 | 3.4 | 0.26 | 0.07 | 99 |
| Comparative Example 1 | Particle A | 5.0 | AB | 1.2 | 25.8 | 1.7 | 6.2 | 3.4 | 0.24 | 0.07 | 91 |
| Comparative Example 2 | Particle B | 8.5 | AB/CNT | 1.0 | 25.8 | 1.7 | 3.0 | 3.4 | 0.12 | 0.07 | 88 |
| Comparative Example 3 | Particle B | 8.5 | AB | 1.0 | 25.8 | 1.7 | 3.0 | 3.4 | 0.12 | 0.07 | 87 |

As shown in Table 1, the secondary battery of Example 1 in which $(R/D)A$ was $2X$ ($=3.4$ mm) or more, $A/D$ was 0.2 or more, and the positive active material layer contained CNTs as a fibrous conductive agent had a high capacity retention ratio after the charge-discharge cycle test. On the other hand, in each of the secondary batteries of Comparative Example 1 in which the values of $(R/D)A$ and $A/D$ were large but the positive active material layer did not contain a fibrous conductive agent, and Comparative Examples 2 and 3 in which the values of $(R/D)A$ and $A/D$ were small, the capacity retention ratio after the charge-discharge cycle test was low.

INDUSTRIAL APPLICABILITY

The present invention can be applied to an electrolyte energy storage device used as a power source for electronic devices such as personal computers and communication terminals, automobiles, and the like.

DESCRIPTION OF REFERENCE SIGNS

100: energy storage device
1: electrode assembly
2: case
3: positive electrode connecting member
4: positive electrode external terminal
5: negative electrode connecting member
6: negative electrode external terminal
7: flat portion
8 (8a, 8b): curved surface portion
11: active material layer surface
12: fibrous conductive agent
13: active material particle
200: energy storage unit
300: energy storage apparatus

The invention claimed is:

1. An energy storage device satisfying a following formula 1, comprising:
a flat electrode assembly obtained by winding a positive electrode and a negative electrode with a separator interposed therebetween and having two curved surface portions facing each other; and
a case that houses the electrode assembly,
wherein at least one of the positive electrode and the negative electrode includes an active material layer containing active material particles and a fibrous conductive agent:

$$(R/D)A \geq 2X \qquad \text{(formula 1)}$$

wherein X is a distance from a distal end of one of the curved surface portions to the inner surface of the case facing the distal end of the curved surface portion as viewed in the winding axis direction of the electrode assembly, R is a length of a periphery of the one curved surface portion as viewed in the winding axis direction of the electrode assembly, D is an average particle size D50 of the active material particles, and A is a surface roughness Ra of the active material layer.

2. An energy storage device satisfying a following formula 2, comprising:
a flat electrode assembly obtained by winding a positive electrode and a negative electrode with a separator interposed therebetween and having two curved surface portions facing each other; and
a case that houses the electrode assembly,
wherein at least one of the positive electrode and the negative electrode includes an active material layer containing active material particles and a fibrous conductive agent:

$$A/D \geq 0.2 \qquad \text{(formula 2)}$$

wherein D is an average particle size D50 of the active material particles, and A is a surface roughness Ra of the active material layer, and
the energy storage device further satisfies the following formula 1:

$$(R/D)A \geq 2X \qquad \text{(formula 1)}$$

wherein X is a distance from a distal end of one of the curved surface portions to the inner surface of the case facing the distal end of the curved surface portion as viewed in the winding axis direction of the electrode assembly, R is a length of a periphery of the one curved surface portion as viewed in the winding axis direction of the electrode assembly, and D and A have the same meaning as D and A in the formula 2.

3. The energy storage device according to claim 1, further satisfying the following formula 3:

$$0.06 \leq X/R \leq 0.12 \qquad \text{(formula 3)}$$

wherein X and R have the same meaning as X and R in the formula 1.

4. The energy storage device according to claim 1, wherein a content of the fibrous conductive agent in the active material layer is 0.01% by mass or more.

5. The energy storage device according to claim 1, wherein an average length of the fibrous conductive agent is larger than an average particle size D50 of the active material particles.

6. The energy storage device according to claim 1, wherein the active material particles are present in a state of secondary particles in which a ratio of an average particle size D50 to a primary particle size is 3 or less, or primary particles that are not substantially aggregated.

7. The energy storage device according to claim 1, wherein the positive electrode has the active material layer containing the active material particles and the fibrous conductive agent.

\* \* \* \* \*